United States Patent [19]

Boyer

[11] 3,755,630

[45] Aug. 28, 1973

[54] WIRED EQUIPMENT SHELF

[75] Inventor: Michel Boyer, Longueuil, Quebec, Canada

[73] Assignee: Bell Canada, Montreal, Quebec, Canada

[22] Filed: June 3, 1971

[21] Appl. No.: 149,484

[52] U.S. Cl. .................................. 179/98, 317/120

[51] Int. Cl. .............................................. H05k 1/07

[58] Field of Search.................. 179/98, 91 R, 91 A, 179/175.25; 317/99, 117, 118, 120, 119; 174/50

[56] References Cited

UNITED STATES PATENTS

| | | | |
|---|---|---|---|
| 3,177,404 | 4/1965 | Patmore | 317/99 |
| 3,462,558 | 8/1969 | Selz | 179/98 |
| 3,394,287 | 7/1968 | Zitzmann et al. | 317/99 |
| 3,541,396 | 11/1970 | Cardwell et al. | 317/119 X |

FOREIGN PATENTS OR APPLICATIONS

| | | | |
|---|---|---|---|
| 1,139,894 | 11/1962 | Germany | 179/98 |
| 1,165,094 | 3/1964 | Germany | 179/98 |
| 1,051,335 | 2/1959 | Germany | 179/91 R |
| 1,245,432 | 7/1967 | Germany | 179/98 |

*Primary Examiner*—Thomas W. Brown
*Attorney*—Philip T. Erickson

[57] ABSTRACT

A mounting shelf for plug-in telephone line equipment is prewired to receive various kinds of vertical circuit board units in a horizontal array. The prewiring gives the options of either arranging in one shelf unit several sequences individual to particular telephone lines, of a few circuit units each, or else placing an ordinary circuit unit in one or more of the available circuit division locations to build longer circuit sequences for some or all of the lines.

17 Claims, 13 Drawing Figures

WIRED EQUIPMENT SHELF

This invention relates to electrical communication equipment and particularly to pre-wired shelves adapted to be mounted in a multiplicity of identical units on standard racks and to hold a multiplicity of small groups of plug-in units.

In a telephone central office it is generally necessary to provide, in addition to the switching network and its directly related equipment, a variety of transmission equipment for the various circuits connecting the central office with external locations. The problem of the disposition of this equipment relates particularly to voice-frequency facilities, where at least two or three conductors, and sometimes several more, must be carried along with each two-way communication channel, and large numbers of circuits are handled side by side in the central office, but some are equipped differently from others because of the different kinds of lines that must be served.

For example, circuits to other offices frequently require amplifiers (known as "repeaters"), and although some amplifiers, known as negative impedance devices, are available to work in a two-wire two-way circuit, on longer circuits the line must be split into two lines, one for each direction of transmission, by what is known as a four-wire termination circuit, so that separate amplifiers can be used for each direction of transmission. Distortion produced by the external line may require the provision of an equalizer. In the case of some lines the amplifier spacing may require a resistance network or "pad" to be associated with one of the amplifiers. Other units that may need to be connected to the lines served by the central office include signaling units for converting dial pulses of the subscriber's line either into d.c. pulses of other characteristics or into multifrequency signaling pulses.

The common practice heretofore has been to provide each type of line equipment in racks or bays of identical units, each for connection in a different line. Each collection of identical units is then connected both on the input and on the output side with a distributing frame on which the various lines are ordered and identified. The, if two or more kinds of equipment are to be connected in a particular line, the conductors serving the line will proceed from a main distributing frame to a bay of one kind of equipment, connect with one unit of equipment there, then proceed from the other side of that unit of equipment to an intermediate distributing frame, then to a bay of another kind of equipment, to one unit of that collection, back to another intermediate distributing frame, and so on, in many cases, to a third bay of equipment and perhaps more before getting back to the main distributing frame. Sometimes the equipment bays and distributing frames involved are not all on the same floor or wing of the central office building.

The arrangement just described introduces much wire length into the circuits. When the facilities connected are not all on the same floor or wing of a building, the added wire risks degrading line circuits that are near the upper limit of permissible resistance, in addition to increasing cross talk between lines. Furthermore, when circuits are rearranged, it is usually necessary to leave the disconnected wires going to distributing frames in place after the connections at the ends are clipped, because pulling out the wire might disturb working circuits, with the result not only of wasting copper, but also of overloading the supporting structures.

The line circuit from one equipment bay to the next by way of a distributing frame often involves more wires per line than the three that the switching network handles. There may be another pair of talking circuit wires, each pair operating in one direction, and/or d.c. simplexing leads or dial pulse leads going along with the talking circuit. The number of soldered or wrapped connections of wire to terminals involved in these dispostions required considerable effort of a kind which is more efficiently done in a factory than in a central office.

In recent years many types of communication equipment, as for example, multiplex terminals for carrier current systems, have been made with a variety of plug-in sub-assemblies which may quickly be replaced, either for the repair of defective units or for the addition of channels not initially equipped. Similarly, communication equipment for military use is often provided with plug-in sub-assemblies for quick assembly or disassembly and also to enable maintenance by simply substituting a spare unit for a working unit and taking the latter to a service location.

Furthermore, in the design of equipment using microcircuits and other small components mounted on and interconnected by printed circuits, some equipment has been composed largely of flat circuit packs each with an array of contacts at one edge of the circuit "board." These plug into a receptacle that holds a large number of parallel circuit boards of this type close together and also provides interconnections. A circuit pack of that type may occupy a space as little as a half inch in the direction perpendicular to the plane of the circuit boards. The terms "circuit card" or "circuit plaque" might be more precisely descriptive of these circuit-carrying stiff sheets of resin-filled laminates, but the expression "circuit board" has been universally adopted to refer to these things.

An object of the present invention is to provide a versatile multiple receptacle for plug-in communication equipment units suitable for a wide variety of such units in various different selections and groupings, in the form of a horizontal unit, generally known as a "shelf," for mounting on a standard communication equipment rack. In order that the necessary flexibility in circuit arrangements may be provided as noted below, each equipment cell of the shelf according to this invention has a width sufficient for two circuit boards, but receptacles for two circuit boards are not provided in every cell: the majority of the cells are provided with a receptacle for only one board. Receptacles are in the form of paired columns of connections for an edge of each board and are provided on the rear wall of the shelf. At certain intervals of the shelf, where it may be desired to split the shelf facilities between equipment serving one particular line and equipment serving another particular line, receptacles for two boards in one cell are provided. In that case, the second circuit board and the receptacle with which it engages provides one row of contacts for external connection to one group of equipment and another row of contacts for external connection to an adjacent group of equipment. A double set of such in and out contacts may, however, be disregarded and the particular cell of the shelf used to hold a single-board equipment unit in the same manner as a cell having a receptacle for only one circuit board, when it is desired to put together a larger sequence of equipment units in the same line circuit.

When the cells provided with an extra set of contacts for in and out connection are used to split the facilities of the shelf among several communication lines, the units which are plugged in to make the in and out connection may conveniently carry test jacks, some for reaching the circuit on one side of the division and some for reaching the circuit on the other side.

In order to contribute to the flexibility of equipment shelves provided according to this invention, the cells with provisions for splitting the mounted equipment into groups may be asymmetrically spaced, to provide for at least one intermediate group of cells greater or less by one than the others. The latter provision allows adjacent groups of cells to be combined into aggregates in a wider variety of sizes.

In the drawings which illustrate embodiments of the invention:

Figure 1:
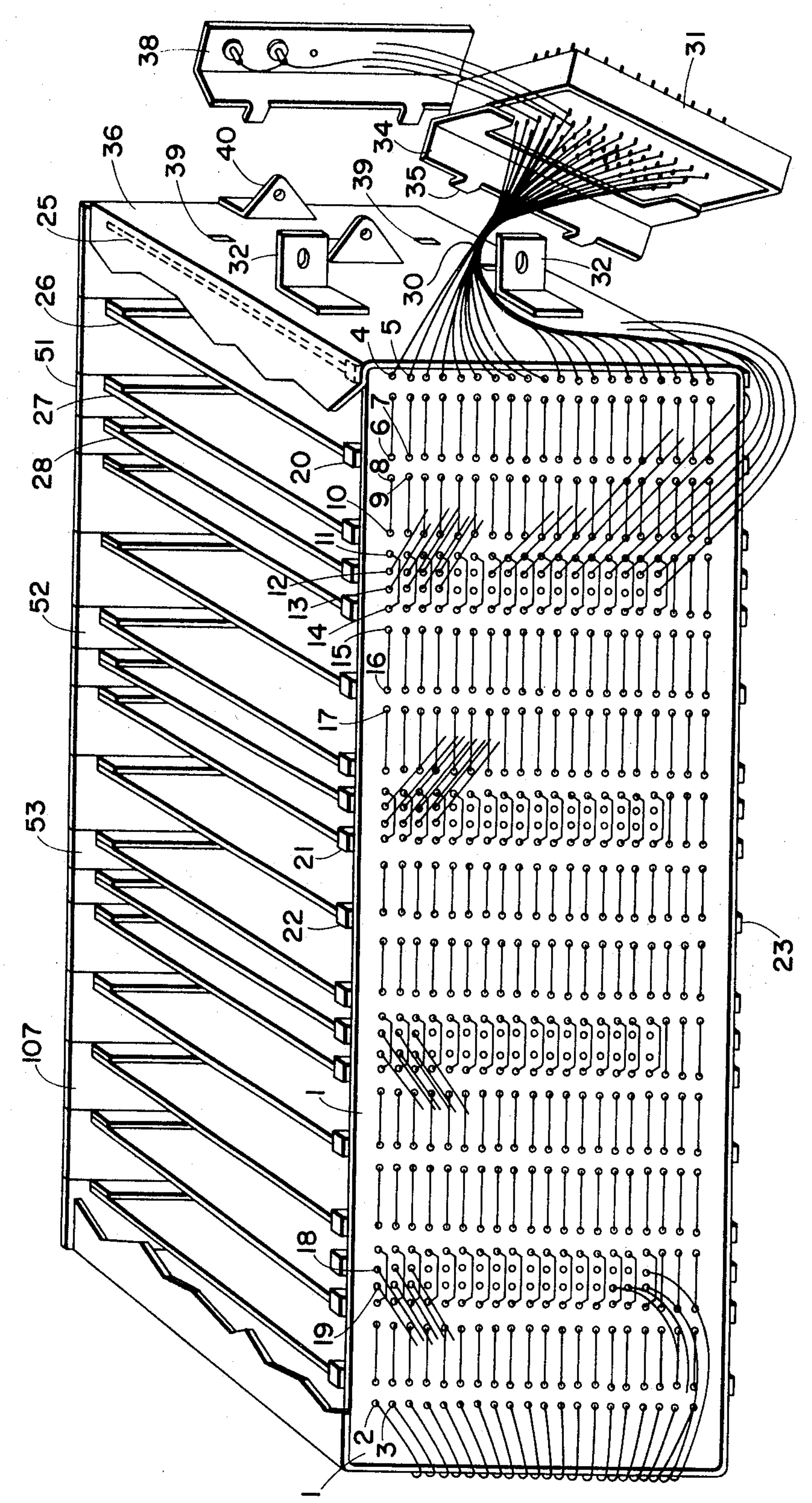
FIG. 1 is a rear view in perspective, with the top broken away and certain external parts unmounted, of an equipment shelf embodying the invention, filled with circuit units of which only the circuit board outlines are shown.

As shown in FIG. 1, the wiring of an equipment shelf according to this invention is carried from cell to cell across the back of the shelf. The rear wall 1 of the shelf is made of insulating material such as a phenolic resin laminate or a glass filled epoxy resin sheet. It carries many vertical rows of terminals such as terminals 2 and 3 at left of FIG. 1, 4 and 5 at the right and, 6, 7 . . . 19 identified for illustration in various placed.

These terminals are arranged in paired vertical columns. Each column pair brackets the median plane of a circuit board, for example the circuit boards 25, 26, 27, and 28. The circuit board intended to be bracketed by the columns of contacts containing the terminals 18 and 19 is missing for a reason that will presently be mentioned.

The columns of terminals on the back of the rear wall of the equipment shelf connect through the rear wall 1 to rows of pressure contacts engaging discrete contact surfaces on the circuit boards. The pressure contacts are preferably organized, as shown, on connector strips of a known type made for engaging circuit board contacts. In this case the connector terminals stick through the rear wall 1 and connect with the wiring shown. Indeed, the connector strips are preferably made with strong moulded housings that may protrude above the rear wall as shown at 20, 21, 22 and 23, in order to snap into the top and bottom members of the equipment shelf and thus serve to support the rear wall 1 as well as to maintain the relative position of top and bottom.

The wiring along the rear wall 1 of the equipment shelf as shown in FIG. 1, consists of horizontal wires connecting the corresponding near side terminals of successive uniformly spaced column parts. Certain double columns of terminals, which are distinguished by being interposed between the other regularly spaced double columns are skipped by the rear-of-shelf wiring. Such a "skipped" column pair, for example, is the one which contains terminals 12 and 13. Another is the one containing terminals 18 and 19.

The equipment shelf shown in FIG. 1 is designed to have the connections to a distributing frame made (a) at terminals of the two end columns and (2) at the additional columns of terminals that are skipped by the previously mentioned horizontal wiring. Of course, only a selection of the many available terminals in any of these columns would be connected to the distributing frame.

Figure 2:
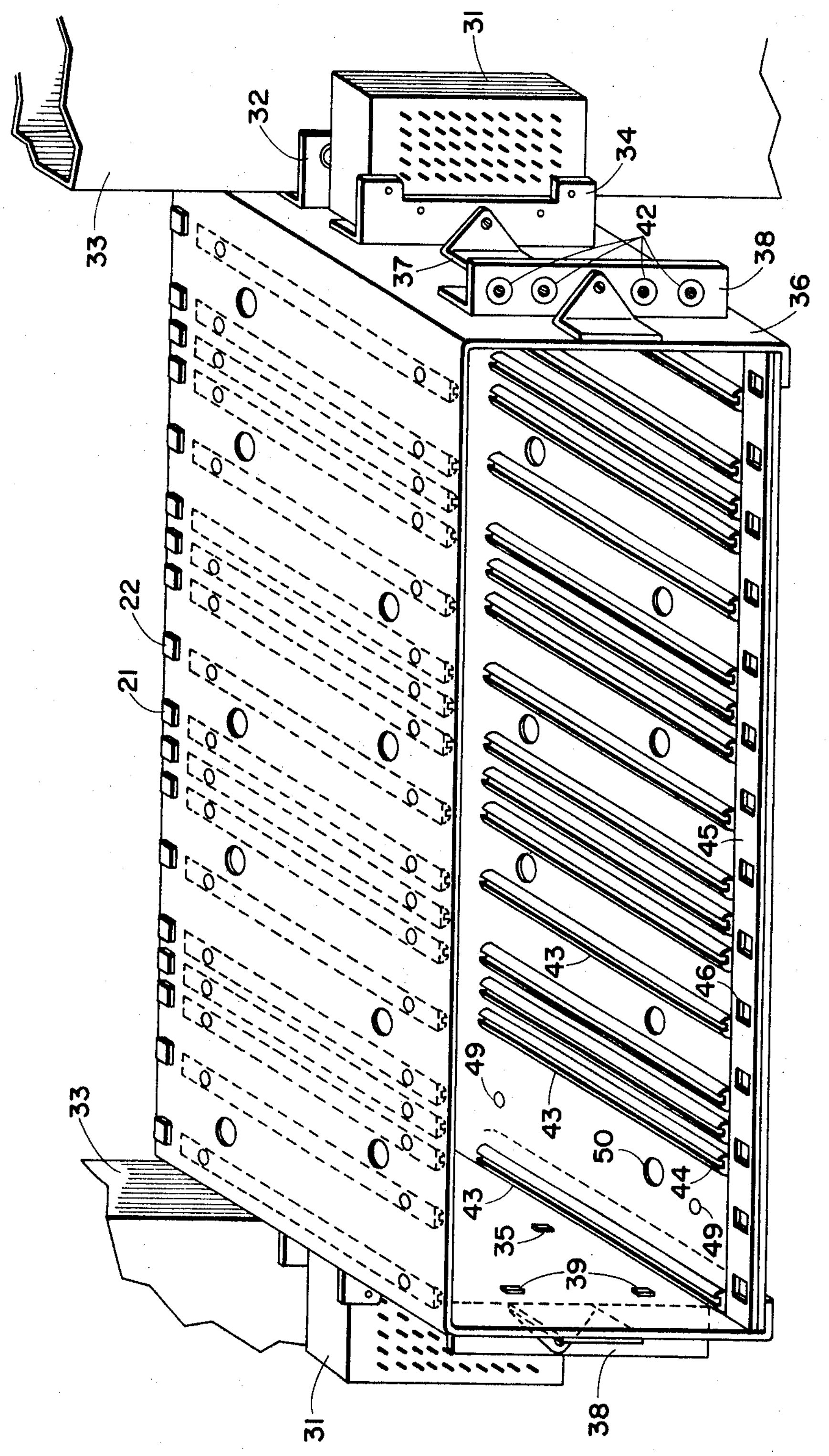
FIG. 2 is a front view, also in perspective, of the equipment shelf shown in FIG. 1, but without any of the circuit units therein.
Figure 4:
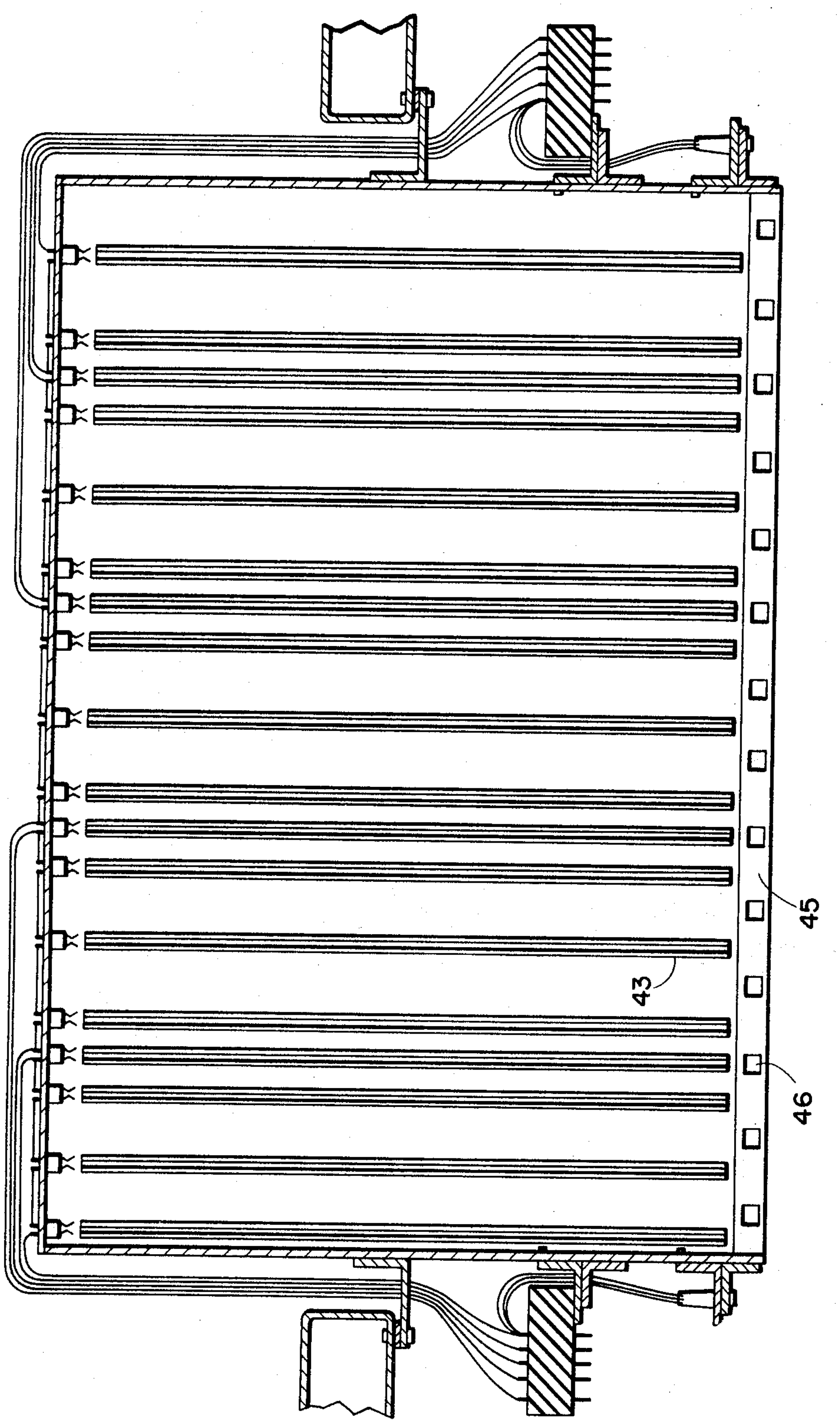
FIG. 4 is a median horizontal section of the empty equipment shelf shown in FIG. 2.

Rear-of-shelf connections are somewhat inconvenient for installation wiring. It is desirable to bring end of sequence connections out to the front of the shelf. For this purpose the form of construction devised by Harold Ostapovitch and Real Hachey is particularly useful. The available connections for ends of circuit sequences are brought out by a cable 30 at one side and by another cable (not shown) at the other side, to multiple terminal blocks 31 adapted to be mounted in front of the shelf's supporting brackets 32. This arrangement avoids using up space usable for plug-in circuit units. One terminal block 31 is shown unmounted in FIG. 1, the way it might hang for the purpose of leaving access to the vertical mounting members 33, which may include a cable duct. In FIG. 2 and FIG. 4 the shelf is shown mounted on the vertical members 33. The terminal block is mounted by a bracket 34, held in place by tabs 35 seated in slots (not shown) in the shelf side wall 36 and by a screw through auxiliary bracket 37 welded to the side wall. A different way of bringing end of sequence connections to the front may have to be used if the shelves are to be mounted on racks with narrow supports barely allowing room for brackets 32 from each side — perhaps a system of staggering in depth the blocks 31 of adjacent units.

A jack strip 38 is similarly removably mounted by means of slots 39 and auxiliary bracket 40. Its jacks 42 are wired to certain terminals of the terminal block as noted further below.

The horizontal connections shown in FIG. 1 may be provided either by ordinary wiring with wrapped or soldered connections or by etched foil or other printed circuit techniques. A large number of terminals are provided in each column so that a uniform assignment of terminals to particular circuit functions can be maintained for the majority of other terminals, to simplify circuit design and maintenance effort. A certain number of wires may be designated "spare," but actually any otherwise unused wire may be used as a spare within a single sequence of circuits, at the cost of at most a little confusion (which can be mitigated by proper markings).

As an illustration of a convenient assignment of circuit functions, the first three terminals counting from the top of each row could be assigned to tip, ring and sleeve conductors of a telephone circuit, the next two to tip and ring when separate two-way circuits are involved and an additional pair is needed, the next two to the "E" and "M" leads of dial pulsing circuits, the next nine to various connections frequently involved in the case of hybrid transformers and networks of four wire terminals and the like (generally designated as A, B, SK, SX, NT, NR, F, G and D), the next few for spares to take care of future circuit pack development and, finally, the last four, at the bottom, for battery and ground, two for each. It is sufficient to connect the battery and ground terminals on each end column on the rear wall to a corresponding terminal on each terminal block 31, omitting additional battery and ground connections from the columns "skipped" by the main row-to-row wiring at the rear of the shelf. A few terminals and connector members at the bottom of the "skipped" columns can accordingly be omitted.

As shown in FIG. 2 the top, bottom and side of the equipment shelf form a casing in which circuit units can be inserted. A series of guides 43 are provided on the inside of the top and bottom surfaces of this casing, supplying grooves 44 in which the top and bottom edges of the circuit board may slide, guiding the circuit board during their insertion until the rear edge engages the connectors of one of the connector strips mounted inside the rear wall. A threshold strip 45 is welded or otherwise fastened just in front of the bottom guides and carries apertures 46 adapted to be engaged by the latches 47 (FIG. 3 and FIG. 5) which serve both to push the circuit boards into their working positions and also to disengage them from the connectors so that they can be easily removed.

The guides 43 are preferably made of molded nylon with snap type bosses protruding from the surface on which they are seated. The bosses are pushed through holes 49 in the top and bottom of the casing, where they hold the guides to the casing. In FIG. 2 the second guide from the left on the bottom surface has been omitted in order to show the holes 49. Other holes may be provided here and there in the top and bottom of the casing surface to assure some ventilation.

The guides and latches shown represent details of just one form of physical realization of an equipment shelf according to the invention. Many other kinds of guides and latches are usable in such equipment shelves. Friction, spring or magnetic catches could be used instead of latched. The particular form of guides, sheet metal housing, etc., is not part of this invention and the preferred form chosen to illustrate the invention was in fact designed by the aforementioned H.J. Ostapovich and R. Hachey.

Figure 3:
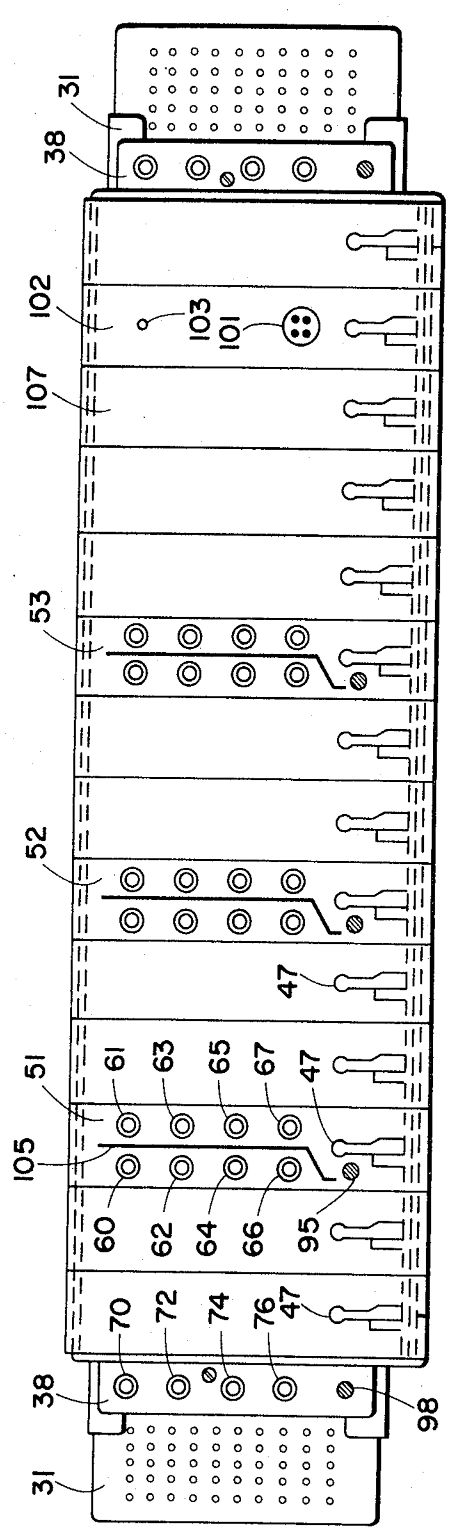
FIG. 3 is a front elevation of the shelf shown in FIG. 1 with circuit units in place.
Figure 6:
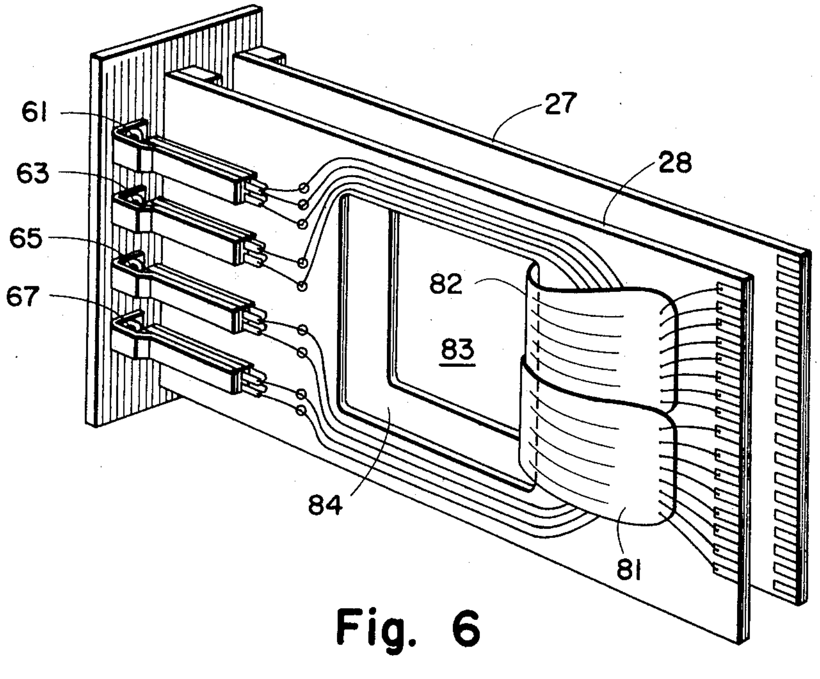
FIG. 6 is a rear perspective view of a circuit division unit for use in an equipment shelf embodying the invention.

FIG. 3 is a front elevation of an equipment shelf with circuit packs and circuit division units in position. Circuit division units 51, 52 and 53 are easily recognized in front by the test jacks that they carry, for example jacks 60, 61 . . . 67 of circuit unit division 51. These jacks are shown slightly displaced to the right because their positions must be arranged so as not to interfere with the two circuit boards carried by the circuit division unit, as shown in FIG. 6 (see also FIG. 1 where the two circuit boards 27 and 28 belonging to unit 51 appear). Test jacks for the outer ends of the circuits in the end positions on the shelf are mounted, as previously described, on brackets 38 and are wired to the terminal fields 31. On the left end for instance, jacks 70, 72, 74 and 76 serve the other end of the circuit made up by the circuit units between circuit division unit 51 and the end of the shelf.

Figure 5:
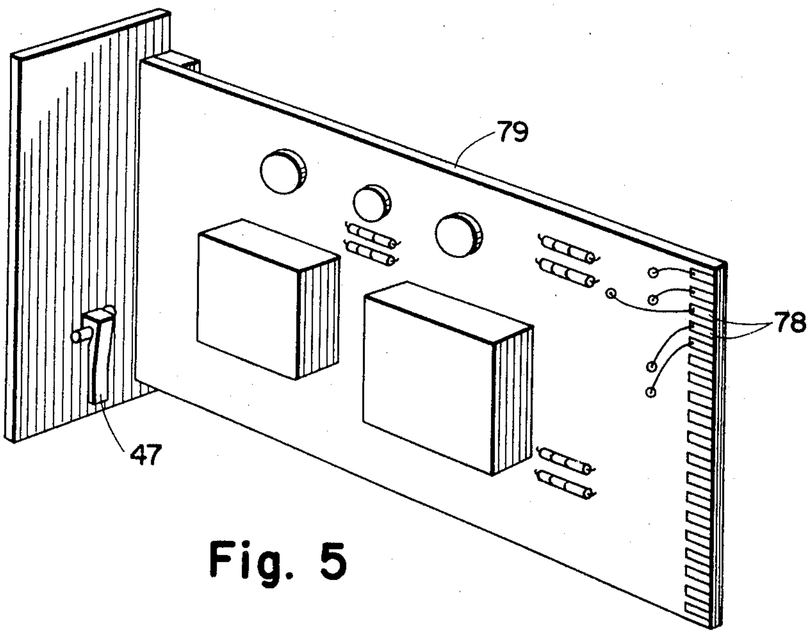
FIG. 5 is a rear perspective view of a circuit unit for use in an equipment shelf embodying the invention.

FIG. 5 shows the typical form of a circuit unit or "circuit pack" of the type adapted for mounting in an equipment shelf. Contacts 78 at the rear of the circuit board 79 engage the connection members of a connector strip unit mounted on the rear wall of the shelf and it is to be understood that another array of contacts (not shown) is on the other side of the circuit board. Contacts on one side of the board which engage conductors at the back of the shelf and which are not needed for connection to the circuits carried on circuit board 79 are preferably connected to the corresponding contacts on the other side of the board by a connection through the board so that this particular conductor on the back of the shelf can be sure to be effectively used in case an adjacent circuit pack should have need of it.

FIG. 6 is a similar illustration of a typical form of circuit division unit which we may take to be the circuit division unit 51, whose circuit boards 27 and 28 have already been identified, as have also the various test jacks. The circuit connections of the circuit unit divisions, including those of the test jacks, need to be discussed by reference to FIGS. 7, 8, 9, and 10 for a full understanding of FIG. 6.

Figure 7:
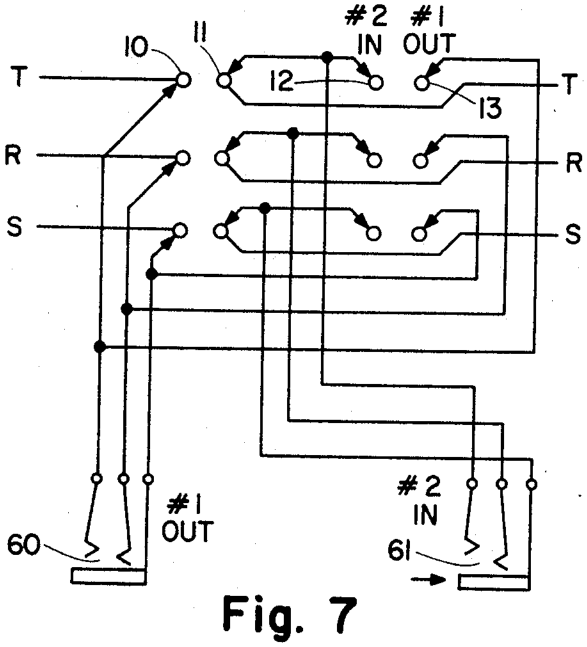
FIGS. 7, 8 and 9 are circuit diagrams showing the wiring of the circuit division units and their test jacks.
Figure 8:
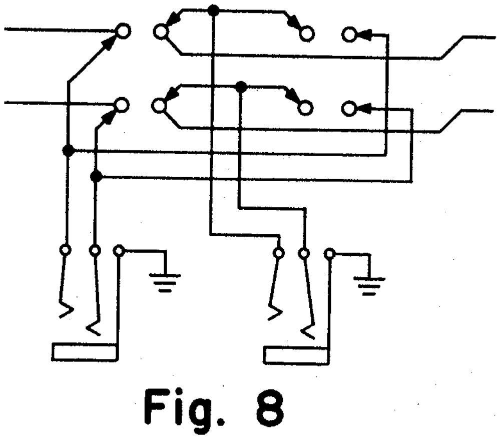
Figure 10:
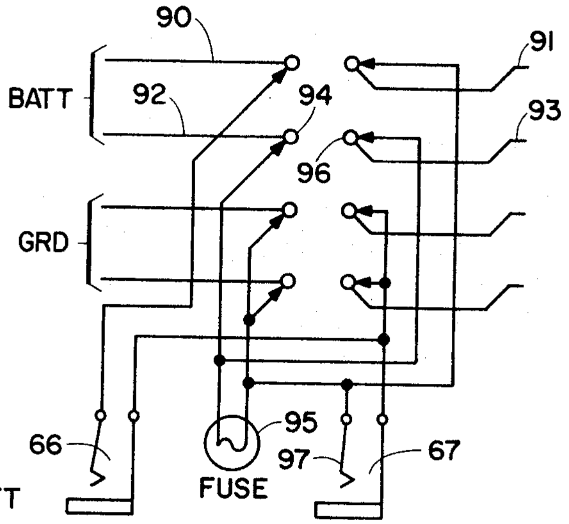
FIG. 10 is a circuit diagram of the wiring of a battery jack and fuse which is alternative to the arrangement shown in FIG. 9.
Figure 9:
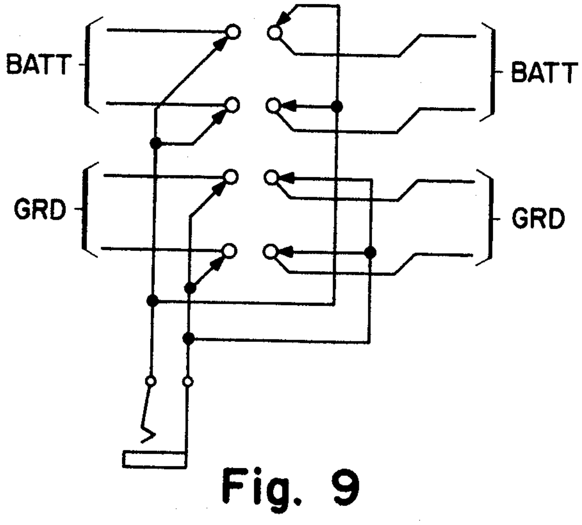

The test jacks on the outboard brackets 38 and their counterparts on the circuit division units 51, 52 and 53 are preferably related to the wiring as follows: the top jack (e.g. 61) brings out tip, ring and sleeve connections of the usual telephone central office line; the second jack (e.g. 63) brings out tip and ring of the circuit in the other direction of transmission when a four-wire circuit is involved; the third (e.g.65) brings out (on tip and ring of the test plug) the "E" and "M" leads of pulsing circuits, and the bottom jack (e.g. 67) bring out battery and ground connections (to the tip and sleeve of a two contact jack). The connections for so doing at outboard positions on brackets 38 are obvious and need not be shown. The connections of the jacks of the plug-in circuit division units are shown in FIG. 7, 8, and 9. FIG. 10 shows an alternative for FIG. 9.

FIG. 7 shows the wiring associated with a pair of jacks in the top position of a test jack unit, for example, jacks 60 and 61 of unit 51 (FIGS. 3 and 6). The horizontal wires T, R and S represent segments of the top three levels of horizontal wiring at the back of the equipment shelf. For further identification, terminals 10, 11, 12 and 13 appearing in FIG. 1 are identified in FIG. 7. As noted in connection with FIG. 6, the rows in which terminals 12 and 13 appear are reversed to simplify wiring of the plug-in circuit division unit. The arrowheads on certain conductors connecting with terminals indicate contact made when the circuit division unit is pressed into its receptacles. The wiring with the arrowheads is on the plug-in unit rather than on the equipment shelf. The disposition of the contacts 10, 11, 12 and 13 in FIG. 7 is as they would be viewed from the front of the shelf.

Assuming that the circuit units are organized with their inputs to the left and their outputs to the right as viewed from the front, the T,R,S wires in FIG. 7 extending to the left-hand side of the figure could represent the output from line sequence 1 carried by the equipment shelf and the T,R & S wires extending to the right could represent an input to line sequence 2 on that equipment shelf. As shown in FIG. 7 the T wire connected to contact 10 is connected to the tip contact of jack 60 mounted on the face plate and also to contact 13 in the right-hand vertical row of contacts connected externally to a distributing frame. The R and S wires appearing at the left of FIG. 5 are similarly connected to the other contacts of jack 60 and to output contacts in the same column. The T wire identified at the right of FIG. 7 passes around contacts 12 and 13 without connecting to either and terminates at contact 11. Here it is adapted to engage connections on the circuit boards carried by unit 51 that will connect it to the tip contact of jack 61 and to contact 12 in the column of input contacts connected with the distributing frame.

Since two-way circuits are generally involved, "input" and "output" are terms that are frequently of purely conventional meaning and sometimes completely inappropriate. There is nothing that requires any particular input or output assignment among the rows of terminals for connections to a distributing frame. It may be convenient for wiring to reverse the relative progression of adjacent similar groups of circuit units so that the connections from one double column of terminals will go to the same distributing frame. On the other hand, it may be less confusing for installation and maintenance to keep identical sequences of circuits similarly oriented on the equipment shelves as seen from the front.

FIG. 8 shows how the pairs of test jacks 62–63 and 64–65 (FIG. 2) are connected. In this case the sleeves of the jacks are grounded, which means, of course, that they are connected to one of the contacts that engages a ground conductor at the back of the equipment shelf. Working conductors of the circuit units on either side are brought out the tip and ring contacts of the respective test jacks. In the case of jacks 62 and 63 the conductors thus brought out are the second tip and ring conductors involved in a four-wire circuit, assuming that the "first" tip and ring conductor set uses jacks 60 and 61. In the case of test jacks 64 and 65 the conductors brought out for test are the E and M leads.

It will be noted that contact 12 and the others in its column, though they serve circuit sequence 2, which is located to the right of circuit sequence 1, are nevertheless disposed to the left of the contact 13 and the others of its column, all of which serve circuit sequence 1. This is to simplify the wiring of the circuit division unit. Contacts 11 and 12 will now engage the respective facing surfaces of circuit boards 27 and 28 (FIG.6) and all the contact tabs in those two columns can be connected across parallel wiring held on a plastic sheet without interfering with the similar wiring connecting the outer arrays of contact tabs by sheet-fixed wiring 81 and 82 passing through apertures 83 and 84 provided in circuit boards 27 and 28, respectively.

As mentioned above, separate battery connections will not usually be brought down from the distributing frame to each line unit that needs a direct current supply. The battery and ground connections will normally be connected straight through all the way across the back of the equipment shelf unit. The battery connection may be provided directly from the battery room to the rack or bay in which the shelves are mounted and then distributed to the various shelves. In this case, there would be no point in having two separate battery test jacks on a circuit division unit such as the unit 51. Hence, if the battery is provided to all the units in common, a single jack connected as in FIG. 9 would be sufficient to make the connection from unit 1 to unit 2 for both battery and ground (two wires being shown for each, as is preferred to assure low impedance connections) and to bring out the battery conductors to a test jack along with ground. It may likewise be found desirable to provide inband or outband signaling frequency or ringing frequency, or both, directly from a central source to equipment shelves.

It may be desirable to provide an individual fuse in the battery connection for each line unit combination of circuit packs, in which case the circuit of FIG. 10 may be used. In this case, the battery connection comes from the left and the upper battery wires 90 and 91 serve to connect the circuit pack of one particular line unit to battery while the lower battery wires 92 and 93 serve to carry battery power through across the back of the equipment shelf to other line units. Thus, the battery power for equipment shelf 2 is picked up from conductor 92 at contact 94, brought through fuse 95 and then connected to conductor 93 through contact 96. The tip connection 97 of jack 67 is connected on the equipment side of fuse 95 and hence determines whether battery power is being delivered to circuit sequence 2. Whether battery power is being delivered to circuit sequence 1 would be determined by testing battery jack 76 (FIG. 3), which in the case under discussion of individually fused units, would be connected to the equipment side of fuse 98. Jack 66 provides a further check on the battery supply to circuit sequence 1 and permits verifying that the circuit boards of the unit are in place and connect the battery line through.

Figure 11:
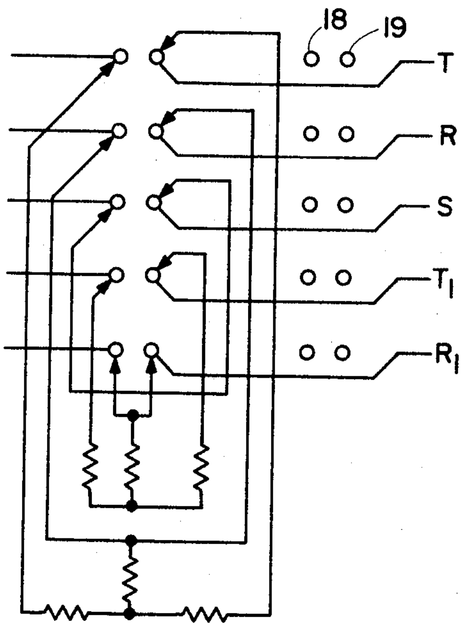
FIG. 11 is a circuit diagram showing connections made when a circuit pack replaces a circuit division unit in the embodiments shown in FIGS. 1 and 2.

FIG. 11 illustrates the use of a cell of an equipment shelf normally usable for a circuit division unit to house and supply a circuit pack forming part of a relatively long circuit sequence, as in the case with circuit pack 107 shown in FIGS. 1 and 3. In this case contacts 18 and 19 and the other contacts in the columns they head are not used. The circuit pack shown in this case simply provides a T network of resistors on each side of a four wire circuit. The sleeve lead S is simply connected through to the next cell. The connecting through of other unused rear of shelf conductors is not shown, but as previously discussed it is generally to be provided.

Where a cell is unused because not needed for a circuit sequence a dummy board should be provided to connect the rear of shelf wiring across the cell. Such a unit is more properly called a "through connector"than a "dummy."

A construction could also be used in which, when a circuit board is withdrawn, each contact spring on the rear wall of the equipment shelf engages its mate in the adjacent paired column. In this case, also, the rear edge of a circuit board could be cut away to avoid engaging contacts of unused wires. In such a construction, however, the contact pressure when the board is withdrawn will be less than when the board is in place. Hence, even with this type of contact spring, the provision of through-connecting dummy boards in unused cells and b. electrical conductors carried by said rear wall, extending generally parallel to said long dimension, and link-ing corresponding terminals of the facing linear terminal arrays of consecutive double columns of said first set of electrical terminals;

c. a first set of pressure contact receptacle members connected with each of said terminals of said first set on the interior of said rear wall and likewise arranged in double columns, being adapted to engage contacts on both sides of an edge of circuit boards insertable along the median plane of the respective double columns;

d. a second set of double columns of mutally insulated terminals carried on said rear wall in non-adjacent intervals between double columns of said first set;

e. a second set of pressure contact receptacle members connected with each of the terminals of said second set on the interior of said rear wall adapted to engage a movable array of conductors arranged in a double column and movable towards and away from said rear wall for contact engagement and disengagement; and f. a multiplicity of guides formed or mounted on said housing adapted to direct circuit boards towards aligned engagement of contacts on each side of their rearmost edges with at least said first set of pressure contact receptacles.

2. A structure as defined in claim 1 in which said second set of pressure contact receptacle members are adapted to engage contacts on both sides of the edges of a circuit board respectively insertable along the median plane of the double columns of terminals to which the terminals of said second set are connected.

3. A structure as defined in claim 1 in which the receptacles respectively associated with at least the terminals of said second set and with a double column of terminals of said first set adjacent to a double column of terminals of said second set do not provide electrical contact between corresponding members in each linear array of a double column when no circuit boards are inserted in said structure.

4. A structure as defined in claim 1 in which the pressure contacts of said first set and the pressure contacts of said second set are so constructed that no electrical contact is established between corresponding contacts of the linear arrays of a double column when no circuit boards are inserted in said structure.

5. A structure as defined in claim 3 in which near the front of said housing, at either end in the long dimension, an angle bracket or flange is located carrying a plurality of test jacks providing access to some of the conductors connected to the end linear arrays of the terminals of said first set.

6. A structure as defined in claim 5 in which said bracket is de-mountably attached or attachable to the outside of the side wall of said housing.

7. A structure as defined in claim 3 further comprising:

g. brackets on the sides of said housing near a median plane adapted to mount said housing in a position sufficiently spaced from vertical supports to permit the passage of a cable; and h. two terminal field blocks dismountably attachable to the sides of said housing in front of said brackets, the terminals of said blocks being connected by cabled wiring to the terminals of said second set and to the terminals of the end arrays of said first set on said rear wall.

8. In combination, a structure as defined in claim 3 and one or more intermediate circuit division units mounted therein and engaging the contacts of said second set and also the contacts of an adjacent double column of contacts of said first set and providing connections between contacts of one linear array of said last-mentioned double column and corresponding contacts of one linear array of said double column of said second set and likewise providing connections between corresponding members of the other linear arrays of the two double columns just mentioned.

9. A combination as defined in claim 8 in which said circuit division units include test jacks at the front thereof at least one of which is connected with conductor connecting contacts of one pair of columns as aforesaid and at least another of which test jacks is connected with conductor connecting contacts of another pair of columns as aforesaid.

10. In combination, a structure as defined in claim 5, and one or more intermediate circuit division units mounted therein and engaging the contacts of said second set and also the contacts of an adjacent double column of contacts of said first set and providing connections between contacts of one linear array of said last-mentioned double column and corresponding contacts of one linear array of said double column of said second set and likewise providing connections between corresponding members of the other linear arrays of the two double columns just mentioned.

11. A combination as defined in claim 10 in which said circuit division units include test jacks at the front thereof at least one of which is connected with conductor connecting contacts of one pair of columns as aforesaid and at least another of which test jacks is connected with conductor connecting contacts of another pair of columns as aforesaid.

12. A combination as defined in claim 10 in which the connections provided by said intermediate circuit division units connect the corresponding contacts of the mutually nearer linear arrays of the two double columns of contacts and separately connect the corresponding contacts of the remaining linear arrays of contacts of said columns, whereby connections for the left-hand circuit sequence are brought out on said rear wall to the right of the connections for the right-hand circuit sequence and vice versa.

13. A combination as defined in claim 8, in which said circuit division units each have two circuit boards provided with a multiplicity of contacts on both sides of their respective rear edges for engagement and connection with pressure contacts of said first set in the case of one of said circuit boards and pressure contacts of said second set in the case of the other of said circuit boards.

14. A structure as defined in claim 3 in which there are at least two double columns of terminals of said first set between any two double columns of terminals of said second set.

15. A structure as defined in claim 3 in which consecutive columns of terminals of said second set are positioned so as to bracket one more double column of terminals of said first set in some cases than in others and in which the double columns of said second set are ordered with the smaller intervals towards one end of said structure and the larger intervals towards the other.

through connecting dummy contacts for idle contact positions of working boards is desirable so that the optimum contact pressure is more likely to be present throughout. The greatest objections to a "closed circuit" set of connectors is that when a circuit division unit is withdrawn for servicing the circuit sequences on either side would then be connected together, which might sometimes give trouble, even though the circuit sequences could not in any case operate by themselves with the circuit division unit withdrawn.

Normally, the test jacks described above will provide all the needed access for test purposes for the circuits carried by the shelf. There may sometimes be occasion,however, for a special unit having provision for connection to a special test set, such as is indicated by the connector jack 101 on circuit pack 102 (FIG. 3). A pilot lamp 103 on unit 102 illustrates other possible exceptional provisions, which could also include a switch or adjustment knob (not shown), preferably with a locking screw, for a variable attenuator network, for example.

Since the face plates of the circuit packs will normally be blank, it is easy to mark them there with functional indicia, even partial or entire circuit diagrams, in order to guide installation and maintenance personnel. Thus a through connector unit could bear horizontal lines across its face to diagram its function. Amplifiers could be indicated by the usual triangular block diagrams, adding designation of the rear-of-shelf conductors involved and similar abstract designations for hybrid networks could be used to indicate four-wire to two-wire transitions. On the circuit division units a heavy line 105 can be applied to the face of the unit between the jacks to separate those serving the circuit sequence to the left from those serving the sequence to the right. Note that the fuse 95, though it serves the sequence to the right, may have to be put at the left to allow easier right-handed access to the latch 47, even though with the position of circuit boards in the circuit packs chosen for this illustration of the invention, it may be necessary to cut away a little of the front of circuit board 27 (FIG. 6) to accommodate the fuse 95.

The presence of circuit pack 107 in a position that could be occupied by a circuit division unit shows how two groups of two circuit pack cells can be combined to form a sequence of 5 circuit packs when more than two are desired to a particular line. In the same way a sequence of 8 or 11 can be set up, or one using all 14 cells of the shelf for consecutive circuits. If less than all of the cells made available by such a combination are desired, one or more of the circuit pack cells can be filled by a through connector.

Figure 12:
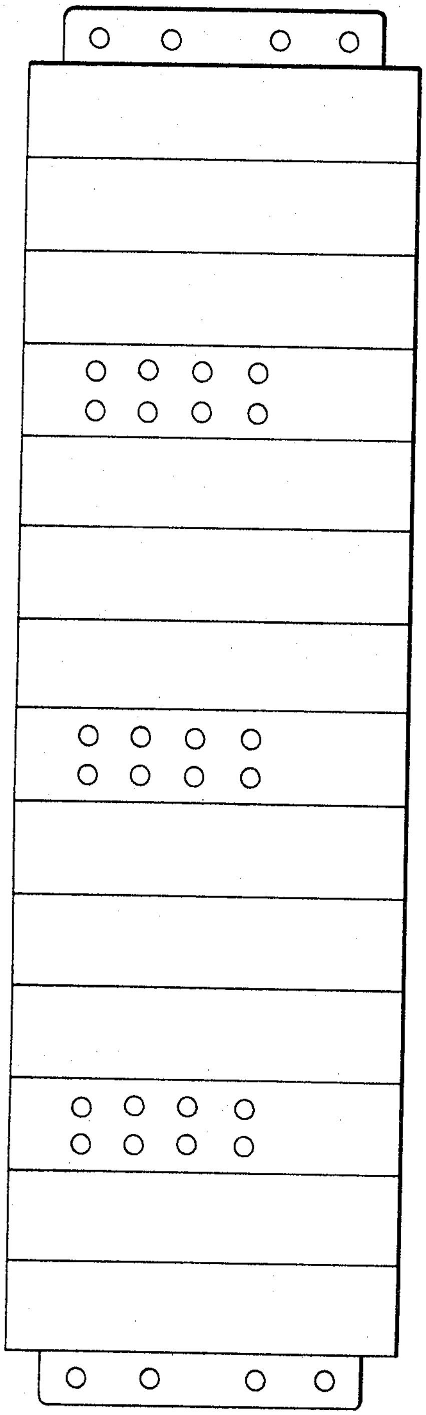
FIG. 12 is a front elevation of another form of equipment shelf embodying the invention.

The use of sequences of just three circuit packs may be so frequently desired that it may be economical of circuit space to provide an equipment shelf embodying the invention in the form shown in front view in FIG. 12 rather than the form of FIG. 3. Both of these arrangements have 14 cells in the shelf casing. In FIG. 12 there is provision for one sequence of two circuits and three of three, and a combination can be set up of 6, 7, 10, or 11, as well as of 14.

In order to fit equipment racks of the types that have long been standard, the length of shelf between the outer ends of the rack with which the holes on the brackets 32 at either end is 19 inches, which is a few millimeters more than 48 centimeters. Space is to be allowed for the cable 30 to go between the vertical member 33 of the rack and the casing of the shelf. That leaves about 16-½ inches for the maximum horizontal dimension of the inside of the casing of the shelf. Thus, for a standard rack, the 14 cell arrangements illustrated in FIGS. 3 and 12 would work out to a cell width between 1-l/2 inches and 1-3/16 inches. This width is quite adequate for circuit unit divisions as well as for circuit packs. Various reasons having no relation to the present invention may move design towards somewhat wider or somewhat narrower circuit packs. One might have 12 cells per shelf, in which case they could be arranged in three sequences of two circuit packs and one of three, with three circuit division units between the sequences. On the other hand, one might reduce the width of the cells to barely 1 inch, which, with proper care for connectors at the rear wall, could still accommodate the two circuit boards of a circuit division unit, in which case 16 cells would be available in a shelf for a standard rack and the arrangement might then look like FIG. 13. Here there are three sequences of two circuit units and two sequences of three circuit units. The five sequences are separated by four circuit division units.

Figure 13:
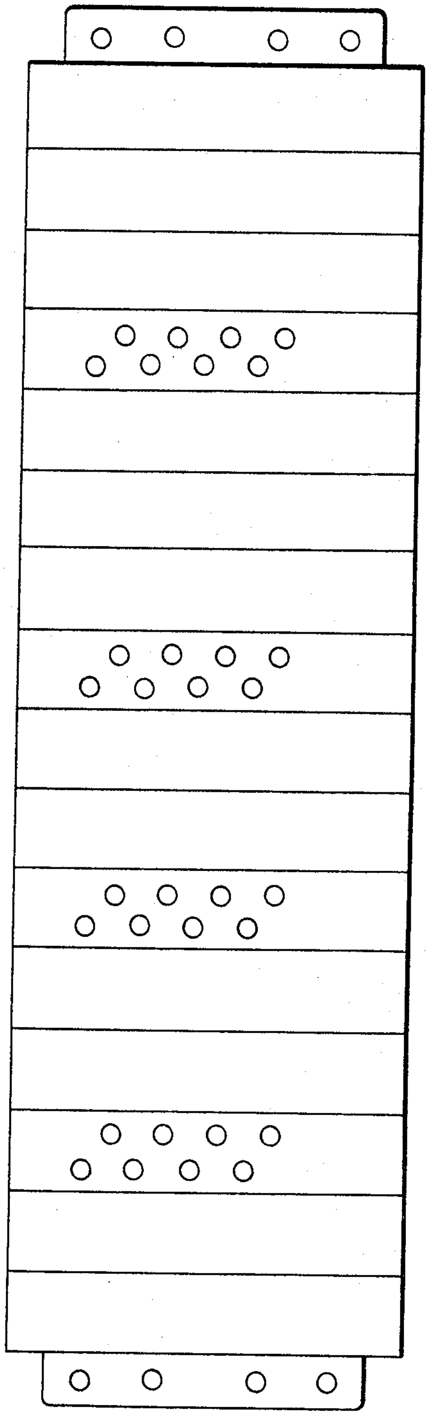
FIG. 13 is a front elevation of still another form of equipment shelf embodying the invention.

In the arrangement of FIG. 13, it is desirable to juxtapose the sequences of two circuit units and likewise to place the sequences of three circuit units next to each other, because this permits the greatest variety in the sizes of sequences that can be built up by omitting one or more circuit division units placing a circuit unit in its place. For example with the arrangement of FIG. 13, it is possible to build up a sequence of 5, 6, 7, 8, 10, 13 or 16 units. On the other hand, if the circuit division unit's position were arranged so as to alternate the sequences of two and three circuit units, it would not be possible to set up sequences of 5, 7, or 8 units. For a similar reason, in the arrangement of FIG. 12 it is desirable to situate the sequence of two circuit units in one of the end positions rather than in one of the middle positions. This principle is the more important when there are more of the smaller sequences than of the larger ones when the maximum number of circuit division units is used.

The maximum vertical dimension can advantageously be 3-½ inches when the shelf is designed to North American standards, but for international standards a slightly larger dimension may be preferable. The smallest vertical dimension compatible with the space needed for the vertical connector arrays on the rear wall is desirable. For the depth dimension (front to back), the internation (C.C.I.T.T.) standard of 8-½ inches (21.6 cm) is to be recommended.

What is claimed is:

1. A structure adapted for plug-in mounting in linear array of an assortment of plug-in circuit units in a plurality of independent sequences each having an individual array of external connections serving each end of the sequence, comprising:

a. an elongated supporting housing adapted for being mounted in parallel multiple aggregations with other units of the same kind, said housing defining an enclosed rectangular volume open at the front, the front being at one of the narrower long sides of said volume, and provided with a rear wall having a first set of mutually insulated electrical terminals arranged in uniformly spaced double columns oriented transverse to the long dimension of said housing;

16. A combination as defined in claim 11, in which said electrical conductors carried by said rear wall of said housing include two linear series of conductors for connecting equipment to a battery, of which one is adapted to carry the battery connection to all equipment mounted in said structure when circuit boards are in engagement with all pressure contact receptacle members of said first set, and of which the other linear set of electrical conductors is adapted to provide a fused direct current supply individual to each group of equipment separated by said intermediate circuit division units, and in which combination the said test jacks include a battery test jack for each such equipment group and a fuse adjacent such test jack connected on the battery side thereof.

17. A structure as defined in claim 1 in which said electrical conductors carried by said rear wall of said housing are provided by a conducting layer pattern of the printed circuit type.

* * * * *